United States Patent
Dicus (10) Patent No.: US 8,286,211 B1
(45) Date of Patent: Oct. 9, 2012

(54) WIRELESS AUDIO AND VIDEO SIGNAL TRANSMITTING AND RECEIVING SYSTEM

(76) Inventor: Tony A. Dicus, Little Rock, AR (US)

(*) Notice: Subject to any disclaimer, the term of this patent is extended or adjusted under 35 U.S.C. 154(b) by 468 days.

(21) Appl. No.: 12/554,027

(22) Filed: Sep. 4, 2009

(51) Int. Cl.
*H04N 7/18* (2006.01)
(52) U.S. Cl. .......... 725/80; 725/81; 725/82; 725/85
(58) Field of Classification Search .......... 725/80–82, 725/85
See application file for complete search history.

(56) References Cited

U.S. PATENT DOCUMENTS

| | | |
|---|---|---|
| 5,047,860 A | 9/1991 | Rogalski |
| 5,708,961 A * | 1/1998 | Hylton et al. .......... 725/81 |
| 6,177,963 B1 | 1/2001 | Foye et al. |
| D438,179 S | 2/2001 | Wang-Tsai |
| 6,263,503 B1 | 7/2001 | Margulis |
| 6,286,142 B1 * | 9/2001 | Ehreth .......... 725/78 |
| 2002/0035729 A1 | 3/2002 | Diep |
| 2002/0039393 A1 | 4/2002 | Shibata et al. |
| 2002/0056114 A1 * | 5/2002 | Fillebrown et al. .......... 725/78 |
| 2004/0068744 A1 * | 4/2004 | Claussen et al. .......... 725/81 |
| 2004/0244040 A1 * | 12/2004 | Vickers et al. .......... 725/81 |
| 2007/0174876 A1 * | 7/2007 | Maggio et al. .......... 725/78 |
| 2008/0059990 A1 * | 3/2008 | Marr et al. .......... 725/10 |
| 2008/0155636 A1 * | 6/2008 | Cruz et al. .......... 725/131 |
| 2008/0216133 A1 * | 9/2008 | Vergoossen .......... 725/86 |
| 2010/0098200 A1 * | 4/2010 | Gupta et al. .......... 375/354 |
| 2011/0014879 A1 * | 1/2011 | Alberth et al. .......... 455/75 |

* cited by examiner

*Primary Examiner* — Jason Salce (57) ABSTRACT

A wireless audio and video signal transmitting and receiving system includes a transmitting assembly including having a first logic circuit, an input for receiving a plurality of channel signals electrically coupled to the first logic circuit and at least one signal transmitter electrically coupled to the first logic circuit. The signal transmitter transmits all of the channel signals on a discrete channel frequency. Each of a plurality of receiving assemblies includes a second logic circuit and signal receiver electrically coupled to the second logic circuit. The signal receiver receives the channel signals from the at least one signal transmitter. An output electrically coupled to the second logic circuit is electrically couplable to a monitoring device to monitor the channel signals received by the signal receiver.

4 Claims, 7 Drawing Sheets

WIRELESS AUDIO AND VIDEO SIGNAL TRANSMITTING AND RECEIVING SYSTEM

BACKGROUND OF THE DISCLOSURE

Field of the Disclosure

The disclosure relates to wireless signal transmitting and receiving devices and more particularly pertains to a new wireless signal transmitting and receiving device for allowing a television channel signal to be wirelessly transmitted from point within a dwelling to a television channel monitoring devices within another area of the dwelling.

SUMMARY OF THE DISCLOSURE

An embodiment of the disclosure meets the needs presented above by generally comprising a transmitting assembly including a housing that has a front wall, a back wall and a perimeter wall extending between and being attached to the front and back walls. A first logic circuit is mounted in the housing and is electrically coupled to the first logic circuit. An input for receiving a plurality of channel signals is mounted on the housing. Each of the channel signals includes a video component and an audio component. A source conduit carrying the channel signals is couplable to the input. At least one signal transmitter is mounted in the housing and is electrically coupled to the first logic circuit. The at least one signal transmitter transmits all of the channel signals on a discrete channel frequency. A power plug is mounted on the back wall of the housing and is insertable into a female power outlet. The power plug is electrically coupled to the first logic circuit. Each of a plurality of receiving assemblies includes a container that has a forward wall, a rearward wall and a peripheral wall attached to and extending between the forward and rearward walls. A second logic circuit is mounted in the container. A signal receiver is mounted within the container and is electrically coupled to the second logic circuit. The signal receiver receives the channel signals from the at least one signal transmitter. An output is electrically coupled to the second logic circuit. The output is electrically couplable to a monitoring device to monitor the channel signals received by the signal receiver.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 9 thereof, a new wireless signal transmitting and receiving device embodying the principles and concepts of an embodiment of the disclosure and generally designated by the reference numeral 10 will be described.

As best illustrated in FIGS. 1 through 9, the wireless audio and video signal transmitting and receiving system 10 generally comprises in one embodiment a transmitting assembly 12 including a housing 14 that has a front wall 16, a back wall 18 and a perimeter wall 20 extending between and is attached to the front 16 and back 18 walls. Tabs 24 may be attached to the housing 14 may receive fasteners for securing the housing 14 to a wall surface. A first logic circuit 21, which may comprise a conventional processor or multiple processors, is mounted in the housing 14. An input 22 for receiving a plurality of channel signals is mounted on the housing 14 and is electrically coupled to the first logic circuit 21. Each of the channel signals includes a video component and an audio component. A source conduit 23 carrying the channel signals is couplable to the input 22. The channel signals would be conventional television signals and the source conduit may be a wired signal from a cable or satellite television provider.

A plurality of signal transmitters 25 is mounted in the housing 14 and is electrically coupled to the first logic circuit 21. Each of the signal transmitters 25 transmits all of the channel signals on a discrete channel frequency selectable for each individual signal transmitter. A power plug 26 is mounted on the back wall of the housing and is insertable into a female power outlet. The power plug 26 is electrically coupled to the first logic circuit 21. The power plug 26 may be positioned adjacent to the input 22 to allow the housing to be mounted on a wall having both a female power outlet 27 and a source conduit 23.

An input actuator 28 is mounted on the housing 14 and is electrically coupled to the first logic circuit 21 to selectively program a channel frequency for each of the transmitters 25. The input actuator 28 may comprise a keypad 29 and scrolling keys 30. A display 31 is mounted on the housing 14 and is electrically coupled to the first logic circuit 21 to display the channel frequency for each of the signal transmitters 25. The display 31 may comprise a liquid crystal display. A power actuator 32 is electrically coupled to the first logic circuit 21. The first logic circuit 21 is turned on or off when the power actuator 32 is actuated.

Figures 1, 2:
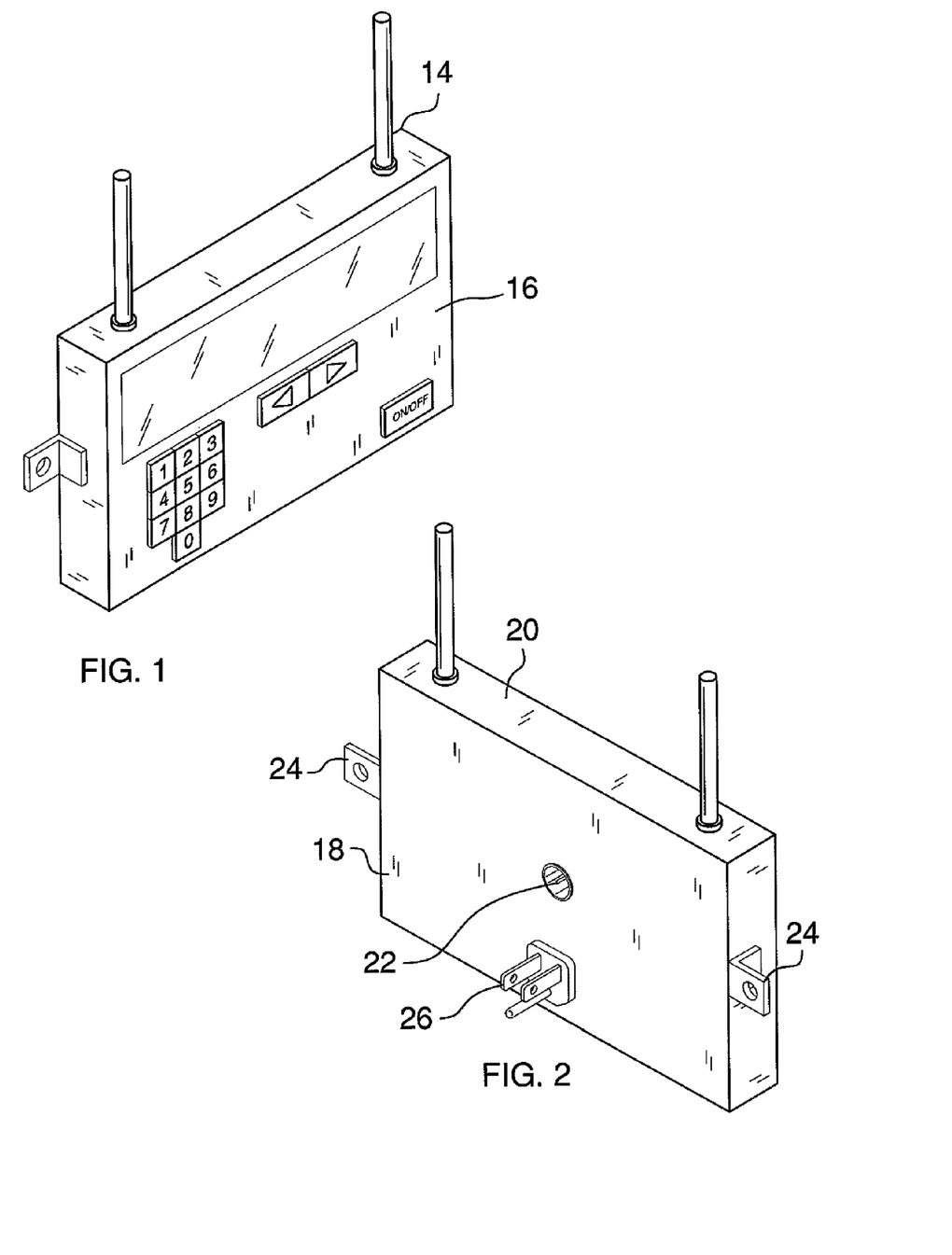
FIG. 1 is a front perspective view of a housing of a wireless audio and video signal transmitting and receiving system according to an embodiment of the disclosure.
FIG. 2 is a rear view of the housing of an embodiment of the disclosure.
Figure 3:
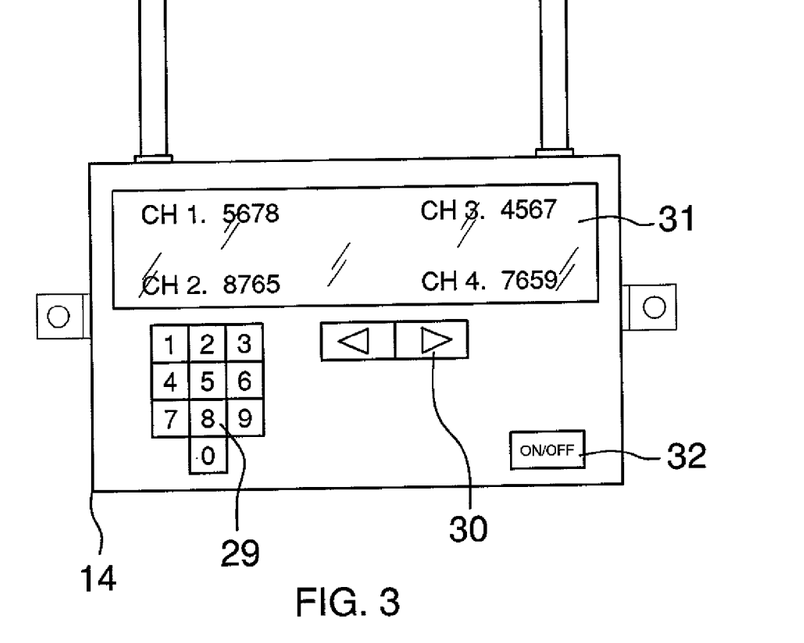
FIG. 3 is a front view of the housing of an embodiment of the disclosure.
Figure 4:
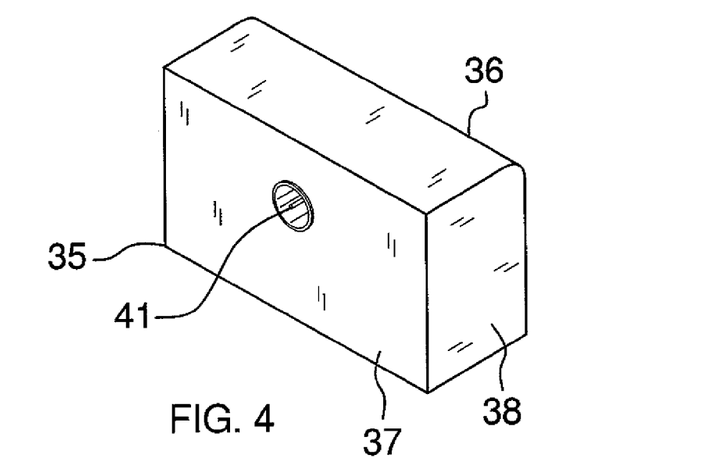
FIG. 4 is a rear perspective view of a receiver of an embodiment of the disclosure.
Figure 5:
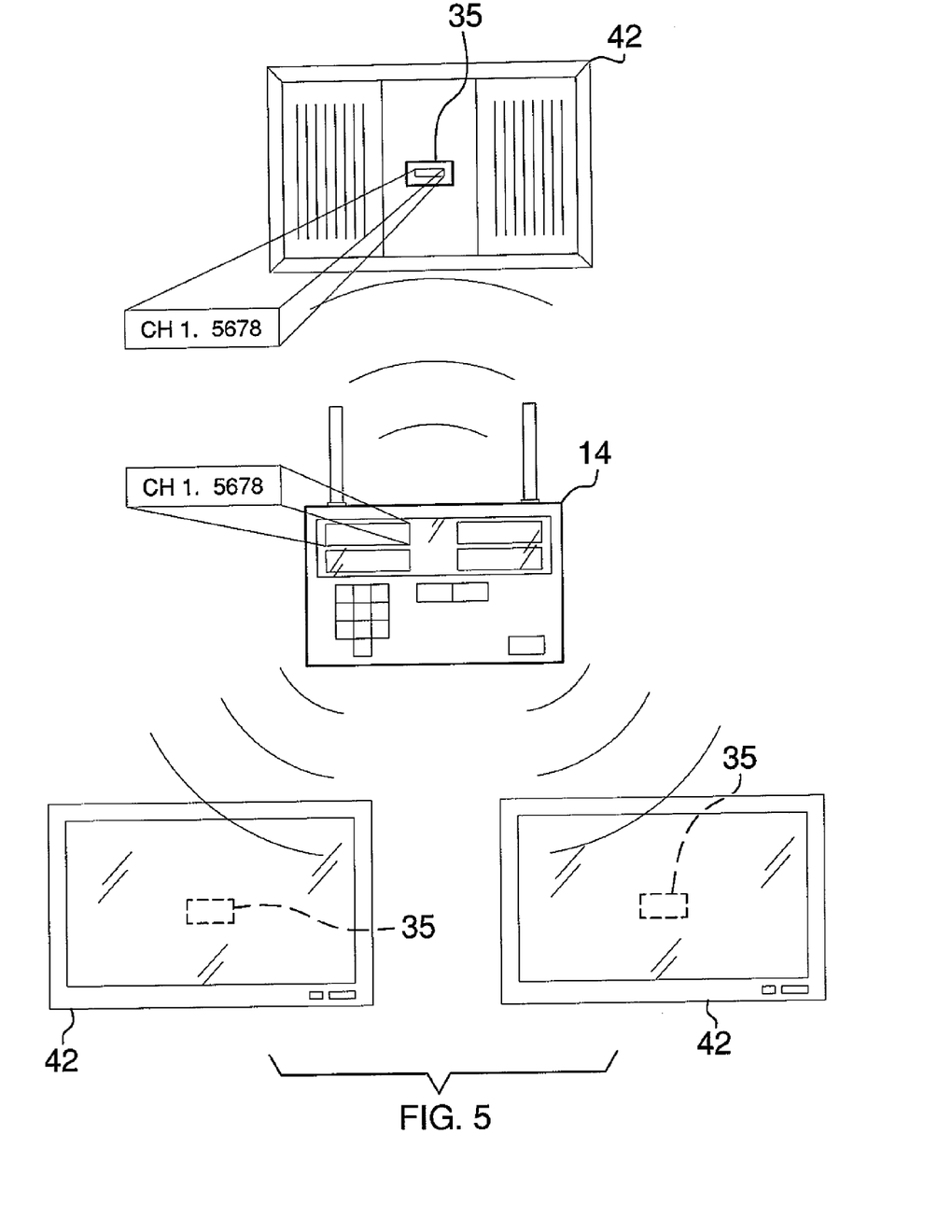
FIG. 5 is an in-use view of an embodiment of the disclosure.
Figure 6:
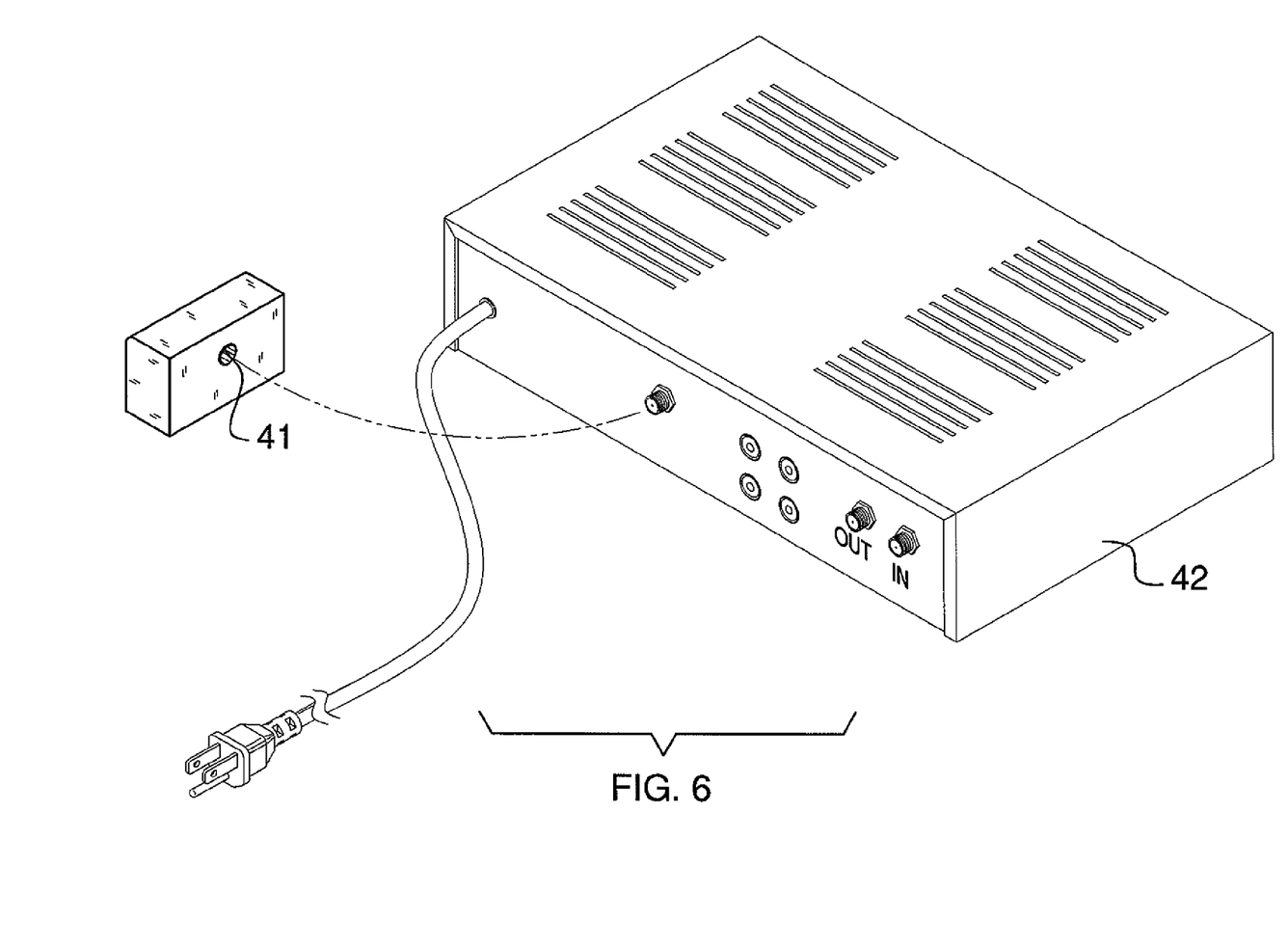
FIG. 6 is a rear perspective view of an embodiment of the disclosure.
Figure 7:
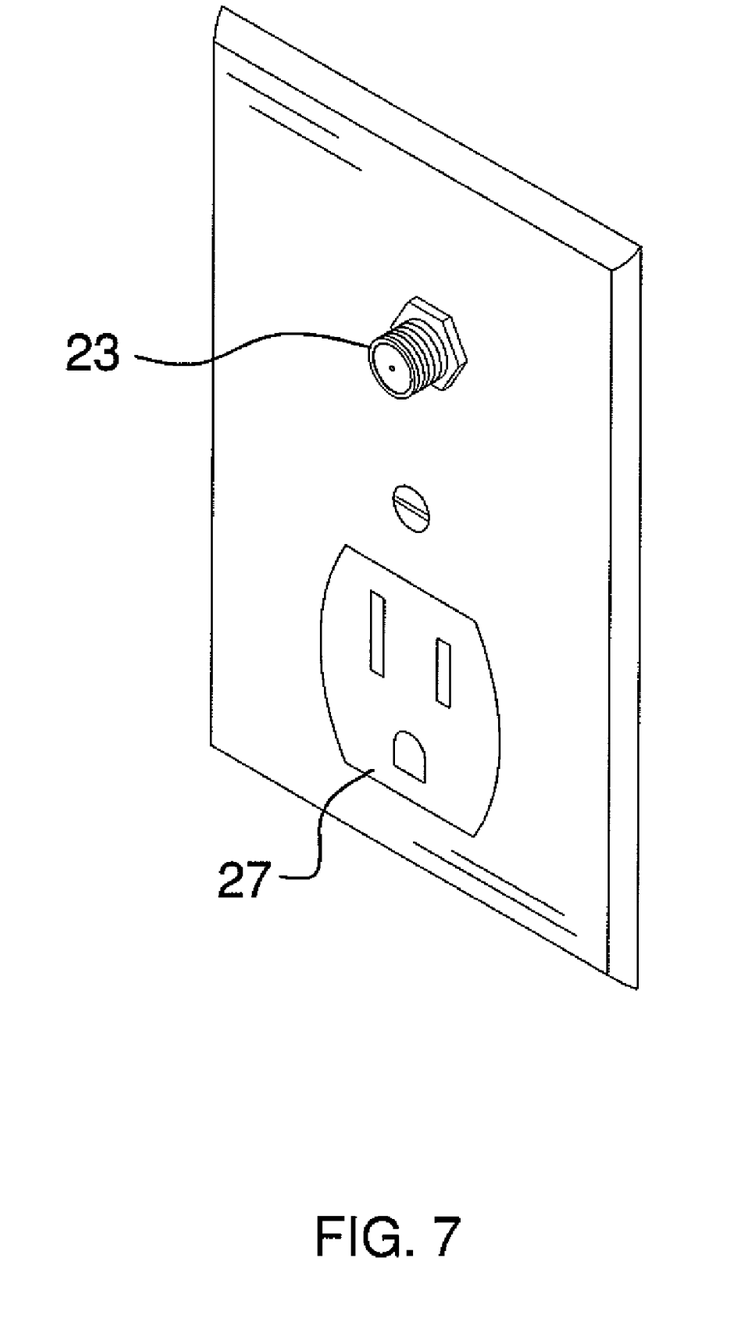
FIG. 7 is a front perspective view of an outlet of an embodiment of the disclosure.

A plurality of receiving assemblies 34 is provided, though it should be understood that this embodiment may include a single signal transmitter 12 and a single receiving assembly 34, or a combination thereof. Each of the receiving assemblies 34 includes a container 35 which has a forward wall 36, a rearward wall 37 and a peripheral wall 38 that is attached to and extends between the forward 36 and rearward 37 walls. A second logic circuit 39, which again may include one or more processors, is mounted in the container 35. A signal receiver 40 is mounted within the container 35 and is electrically coupled to the second logic circuit 39. The signal receiver 40 receives the channel signals from only one of the signal transmitters 25. This is done by assigning the signal receiver 40 to only one or two channel frequencies which is matched to the selected output signal of one of the signal transmitters 25. An output 41 is electrically coupled to the second logic circuit 39. The output 41 is electrically couplable to a monitoring device 42 to monitor the channel signals received by the signal receiver. The monitoring device 42 may include a decoding apparatus, as shown in FIG. 6, to decode and select one of the channel signals for viewing on a television or for recording to view later. Alternatively, the monitoring device 42 may include a television itself, as shown in FIG. 5, with a tuner built therein for decoding and selecting one of the channel signals.

The above system 10 does allow for a single signal transmitter 25 to be mounted in the housing 14 which transmits all of the channel signals on a discrete channel frequency so that the channel signals can only be accessed by authorized users. In such an embodiment, each of the receiving assemblies 34 may be assigned the same discrete channel frequency. Alternatively, the system 10 may include a plurality of signal transmitters 25 each only sending a selected number of the channel signals to divide the entire spectrum of all channel signals into manageable packets. The receiving assemblies 34 would then be programmed to access a particular transmitter's 25 frequency based upon the channel signal being selected.

Finally, the transmitter 25, or transmitters, may be a pass through apparatus which simply transmits each of the channel signals on their own discrete frequency to which the receiving assemblies may be tuned to select. This allows each receiving assembly 34 to access one of the channel signals independent of the other receiving assemblies 34.

Figure 9:
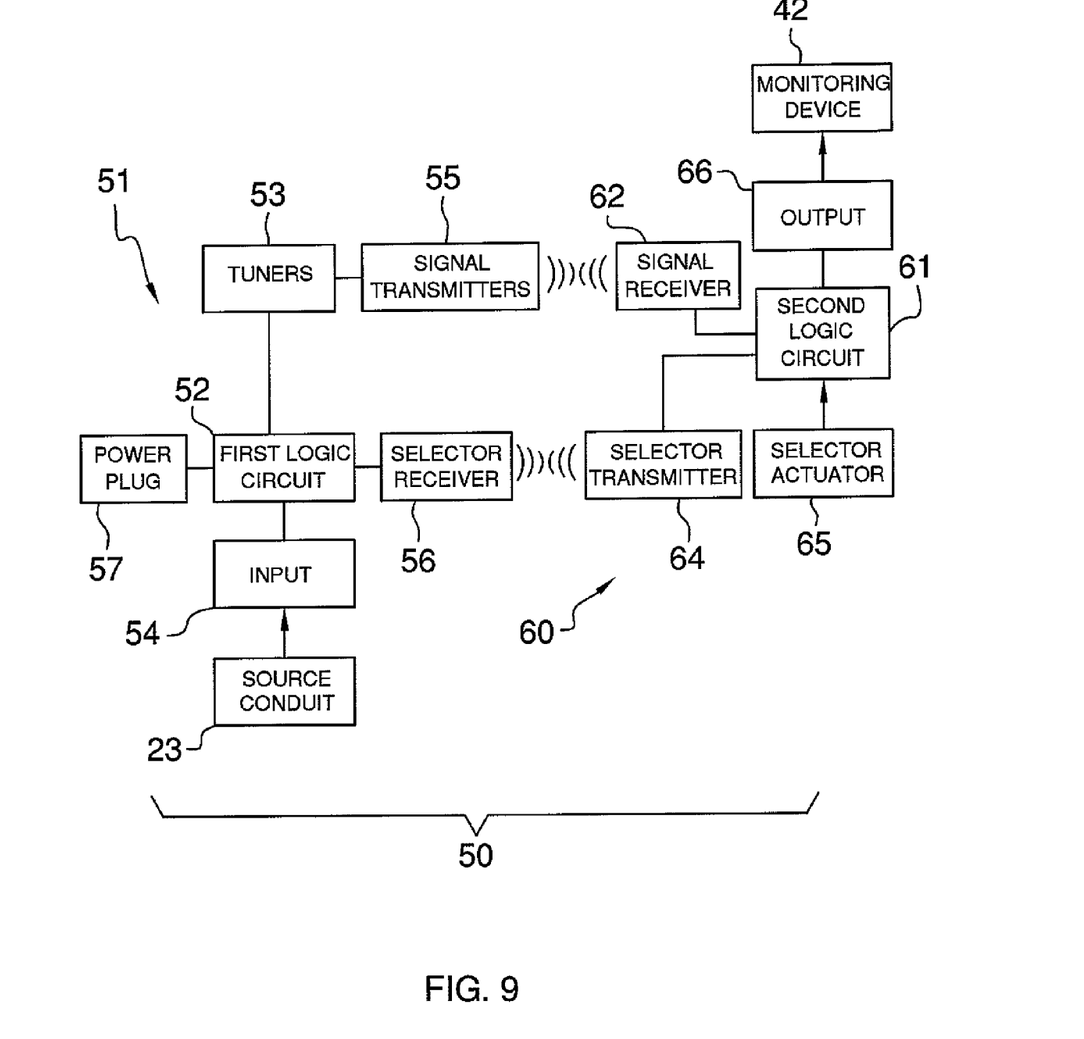
FIG. 9 is a box diagram of another embodiment of the disclosure.

Another embodiment of the system 50 includes a transmitting assembly 51 that again has a housing 14 which has a front wall 16, a back wall 18 and a perimeter wall 20 extending between and being attached to the front 16 and back 18 walls. A first logic circuit 52 is mounted in the housing 14. A plurality of tuners 53 is mounted in the housing 14 and each is electrically coupled to the first logic circuit 52. An input 54 for receiving a plurality of channel signals is mounted on the housing 14. Each of the channel signals includes a video component and an audio component. Each of the tuners 53 is electrically coupled to the input 54. The tuners 53 are each actuatable to select and parse out one of the channel signals. A source conduit 23 carrying the channel signals is again couplable to the input 54.

A plurality of signal transmitters 55 is mounted in the housing 14. Each of the signal transmitters 55 is electrically coupled to the first logic circuit 52. The transmitters 55 wirelessly transmit a channel signal selected by an associated one of the tuners 53. A selector receiver 56 for wirelessly receiving a plurality of selector signals is mounted in the housing 14 and is electrically coupled to the first logic circuit 52. Each of the selector signals is associated with only one of the tuners 53. One of the tuners 53 is actuated to select one of the channel signals indicated by a received one of the selector signals when the selector receiver 56 receives the corresponding one of the received selector signals. A power plug 57 is mounted on the back wall of the housing 14 and is insertable into a female power outlet 27. The power plug 57 is electrically coupled to the first logic circuit.

A plurality of receiving assemblies 60 is also provided. Each of the receiving assemblies 60 again includes a container 35 that has a forward wall 36, a rearward wall 37 and a peripheral wall 38 attached to and extending between the forward 36 and rearward 37 walls. A second logic circuit 61 is mounted in the container 35. A signal receiver 62 is mounted within the container 35 and is electrically coupled to the second logic circuit 61. The signal receiver 62 receives the channel signals from only one of the tuners 53 defining an associated tuner.

Each of the receiving assemblies 60 also includes a selector transmitter 64 that is electrically coupled to the second logic circuit 61 and is mounted within the container 35. The selector transmitter 64 is in wireless communication with the selector receiver 56 to communicate selector signals to the selector receiver 56. All receivers and transmitters of each system 10, 50 may comprise transceivers as well. A selector actuator 65 is in communication with the second logic circuit 61. The selector actuator 65 is actuated to trigger the selector transmitter 64 to emit one of the selector signals as determined by the selector actuator 65 to selectively determine which of the channel signals is to be decoded by the associated tuner 53 and transmitted to the signal receiver 62. The selector actuator 65 may be mounted on a wireless remote control in communication with the second logic circuit 61 or may be actuators mounted on the monitoring device 42 and electrically coupled to the second logic circuit by an output 66 that is electrically coupled to the second logic circuit 61 and again used to monitor the channel signal received by the signal receiver 62.

Figure 8:
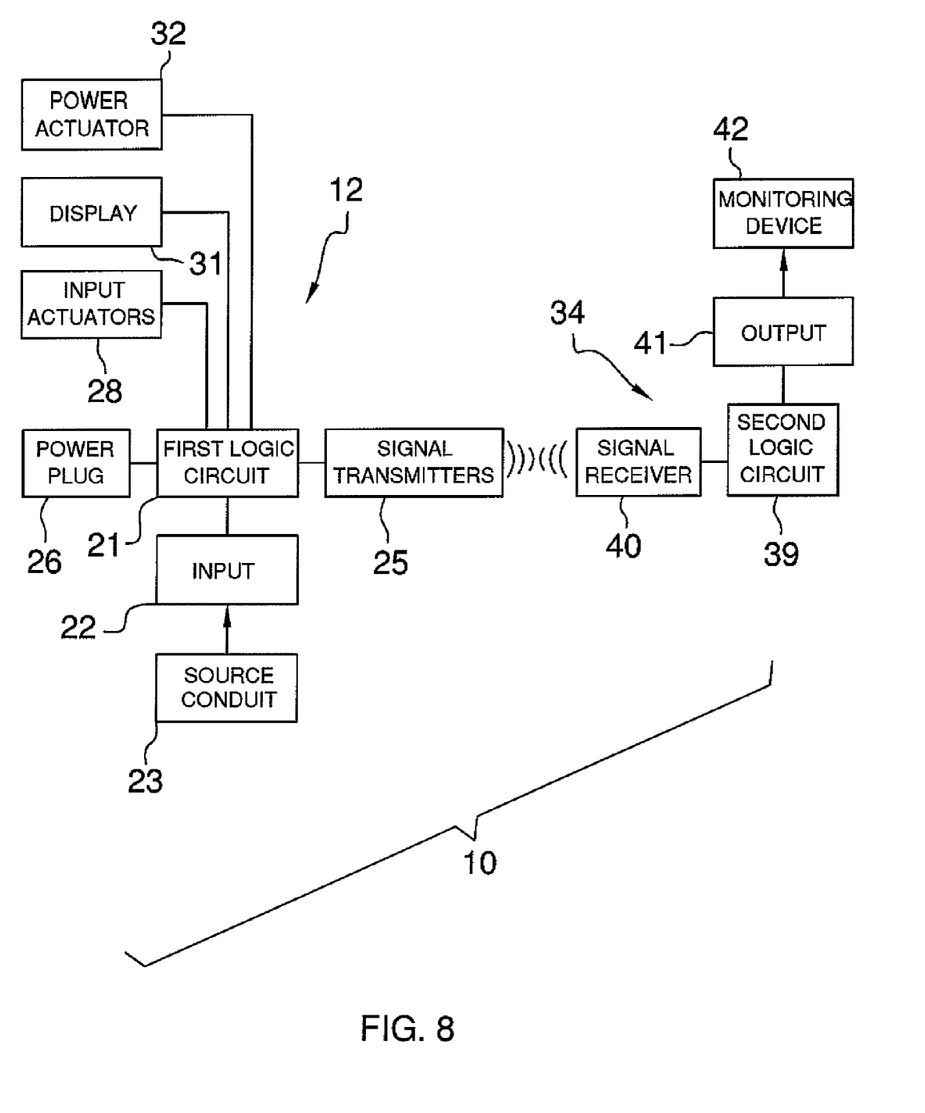
FIG. 8 is a box diagram of an embodiment of the disclosure.

The embodiment of this system 50, unlike the one shown in FIG. 8, uses a tuner to immediately parse out a single channel signal which is transmitted as directed by the selector signals sent by the selector transmitter 64 and received by the selector receiver 56. The other system 10, however, sends all channel signals to be parsed out at the receiving end by the monitoring device 42 itself. A modification of system 50 may include a plurality of tuners 53 but only a single signal transmitter 55 electrically coupled to each of the tuners 53. The signal transmitter 55 will transmit all of the channel signals selected by the selector transmitters of the various receiving assemblies. This will allow for a more compact design.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A video and audio signal transmitting and receiving system comprising:
   a transmitting assembly including;
      a housing having a front wall, a back wall and a perimeter wall extending between and being attached to said front and back walls;

a first logic circuit being mounted in said housing;

an input for receiving a plurality of channel signals being mounted on said housing and being electrically coupled to said first logic circuit, each of said channel signals including a video component and an audio component, wherein a source conduit carrying said channel signals is couplable to said input;

at least one signal transmitter being mounted in said housing and being electrically coupled to said first logic circuit, said at least one signal transmitter transmitting all of said channel signals;

a power plug being mounted on said back wall of said housing and being insertable into a female power outlet, said power plug being electrically coupled to said first logic circuit;

a plurality of receiving assemblies, each of said receiving assemblies including;

a container having a forward wall, a rearward wall and a peripheral wall being attached to and extending between said forward and rearward walls;

a second logic circuit being mounted in said container;

a signal receiver being mounted within said container and being electrically coupled to said second logic circuit, said signal receiver receiving said channel signals from said at least one signal transmitter;

an output being electrically coupled to said second logic circuit, said output being electrically couplable to a monitoring device to monitor said channel signals received by said signal receiver;

wherein said at least one signal transmitter includes a plurality of signal transmitters, each of said signal transmitters transmitting all of said channel signals on a selectable and discrete channel frequency for each individual signal transmitter, said signal receiver receiving said channel signals from only one of said transmitters; and further including an input actuator mounted on said housing and being electrically coupled to said first logic circuit to selectively program a channel frequency for each of said transmitters.

2. The system according to claim 1, further including a display mounted on said housing and being electrically coupled to said first logic circuit to display the channel frequency for each of said transmitters.

3. The system according to claim 1, further including a power actuator being electrically coupled to said first logic circuit, said first logic circuit being turned on or off when said power actuator is actuated.

4. The system according to claim 1, wherein said at least one transmitter transmits each of said channel signals on its own discrete frequency, each of said receiving assemblies being tunable to one of said discrete frequencies to access a selectable one of said channel signals.

* * * * *